United States Patent [19]

Ohtsu et al.

[11] Patent Number: 5,186,595
[45] Date of Patent: Feb. 16, 1993

[54] APPARATUS FOR LOADING AND UNLOADING A WORKPIECE

[75] Inventors: Ikuo Ohtsu, Toyota; Kinichi Kataoka, Ohbu; Shoichi Sano, Gamagori, all of Japan

[73] Assignee: Toyoda Koki Kabushiki Kaisha, Kariya, Japan

[21] Appl. No.: 760,920

[22] Filed: Sep. 17, 1991

[30] Foreign Application Priority Data

Sep. 21, 1990 [JP] Japan .................. 2-250026

[51] Int. Cl.$^5$ ............................................ B25J 11/00
[52] U.S. Cl. .................................. 414/225; 414/736; 414/741
[58] Field of Search ............... 414/225, 226, 733, 734, 414/735, 736, 738, 739, 743, 745.7, 741; 51/215 IT, 215 GP; 82/124, 125, 126

[56] References Cited

U.S. PATENT DOCUMENTS

| | | | |
|---|---|---|---|
| 3,651,958 | 3/1972 | Evans et al. | 414/591 |
| 3,658,190 | 4/1972 | Fournier . | |
| 3,954,164 | 5/1976 | Bottomley | 414/739 X |
| 4,082,018 | 4/1978 | Russell et al. | 414/680 X |
| 4,678,393 | 7/1987 | Mink | 414/751 |

FOREIGN PATENT DOCUMENTS

| | | | |
|---|---|---|---|
| 2942060 | 4/1981 | Fed. Rep. of Germany | 414/226 |
| 62-28150 | 2/1987 | Japan | 414/226 |
| 963846 | 10/1982 | U.S.S.R. | 414/736 |
| 1013262 | 4/1983 | U.S.S.R. | 414/225 |
| 1217654 | 3/1986 | U.S.S.R. | 414/226 |

*Primary Examiner*—Michael S. Huppert
*Assistant Examiner*—William M. Hienz
*Attorney, Agent, or Firm*—Oblon, Spivak, McClelland, Maier & Neustadt

[57] ABSTRACT

An apparatus for loading and unloading a workpiece between a working position of a machine tool and a waiting position provided outside the machine tool. The apparatus comprises a rotational shaft which is supported to be rotatable about its axis extending in parallel with an axis of a work spindle, and is rotated in a clockwise direction or a counterclockwise direction within a required rotational angle by an actuator. On a bracket fixed on one end of the rotational shaft, there are installed a loading arm unit and an unloading arm unit. The loading arm unit and the unloading arm unit are arrayed in a direction of the axis of the work spindle, and extend in an up-and-down direction along a pair of lines, which intersect with each other at a predetermined angle so as to interact at the working position, respectively. Each of the loading arm unit and the unloading arm unit has a pair of gripping claws extending in a direction which is normal to the axis of the work spindle.

3 Claims, 4 Drawing Sheets

APPARATUS FOR LOADING AND UNLOADING A WORKPIECE

BACKGROUND OF THE INVENTION (1) Field of the Invention

The present invention relates to an apparatus for loading and unloading a workpiece into or from a machine tool.

(2) Discussion of the Prior Art

FIGS. 1 and 2 show a conventional apparatus for automatically loading and unloading a workpiece between a working position in a machine tool and an outside of the machine tool. In this apparatus, a rotational shaft 3 is supported to be rotatable about its axis on a support base 2 which is fixed on a work head 1. The rotational shaft 3 is disposed so that its axis is parallel with an axis O of a work spindle. This rotational shaft 3 has at one end a lever 4, which is fixedly supported on the one end of the rotational shaft 3. The lever 4 is connected at the other end with a cylinder 5, which is provided for rotating the rotational shaft 3 in such a manner that the rotational shaft 3 can be rotated in a clockwise direction or a counterclockwise direction within a required rotational angle in response to an expansion or a contraction movement of the cylinder rod which is caused by actuation of the cylinder 5.

The other end of the rotational shaft 3 is fixed with a bracket 6. The bracket 6 has an installation surface which extends in a direction normal to the axis O of the work spindle. On the bracket 6, there are provided a pair of workhands 7a, 8a. These pair of workhands 7a, 8a are provided to be slidable in a direction normal to the axis O of the work spindle through a pair of guide bars 7b, 8b. The guide bar 7b guides the workhand 7a along an inclined line in an up-and-down direction, and the guide bar 8b guides the workhand 8a along a vertical line in an up-and-down direction. There are further provided a pair of cylinders 7c, 8c. These pair of cylinders 7c, 8c are connected with the workhands 7a, 8a. The workhands 7a, 8a are actuated to be able to shift on the guide bars 7b, 8b by the cylinders 7c, 8c, respectively.

The workhand 7a, the guide bar 7b, and the cylinder 7c constitutes a loading arm unit 7. To the contrary, the workhand 8a, the guide bar 8b, and the cylinder 8c constitutes an unloading arm unit 8. The loading arm unit 7 and the unloading arm unit 8 are disposed on the same plane which is located normal to the axis O of the work spindle. Further, the loading arm unit 7 and the unloading arm unit 8 are spaced with each other so that the axis of the loading arm unit 7; i.e. the axis of the guide bar 7b, and the axis of the unloading arm unit 8; i.e. the axis of the guide bar 8b, intersect with each other at an inclined angle $\theta'$. This is for preventing the loading arm unit 7 and the unloading arm unit 8 from interfering with each other in each loading or unloading operation.

In such an apparatus constituted as described above, in order to grip an unfinished workpiece W conveyed at an waiting position A located outside a machine tool, the rotational shaft 3 is rotated to change the direction of the loading arm unit 7 in such a manner that the direction of the loading workhand 7a points to the unfinished workpiece W disposed outside of the machine tool. Then, the workhand 7a is lowered to grip the workpiece W. After the workhand 7a grips the workpiece W, the workhand 7a is raised, and then, the rotational shaft 3 is rotated again to change the direction of the workhand 7a to the beginning position. That is, the rotational shaft rotates until the direction of the workhand 7a points to a working position B.

Furthermore, at the condition that, while the workhand 7a keeps holding the unfinished workpiece W for the next working operation, the unfinished workpiece W is already loaded on the working position B by the previous loading operation, the working operation in which the manufacturing of the workpiece W, which is already loaded by the previous loading operation, is commenced. When this working operation is completed, the unloading arm unit 8 begins its unloading operation. That is, the unloading arm unit 8 is disposed exactly above the working position B, and the workhand 8a of the unloading arm unit 8 is lowered to grip the finished workpiece W finished in this working operation. The workhand 8a is raised after the workhand 8a gripped the finished workpiece W.

After these operation, the workhand 7a which has kept holding the next unfinished workpiece W is lowered to release the unfinished new workpiece W on the working position B. The workhand 7a is raised to the initial upper position after the unfinished new workpiece W is loaded on the working position B.

Then, the rotational shaft 3 is rotated to change the direction of the unloading arm unit 8 in such a manner that the direction of the workhand 8a is turned toward position A located outside the machine tool. The workhand 8a is lowered to release the finished workpiece W, which is finished in the previous working operation, to the position A located outside the machine tool. The workhand 8a is raised until it returns the initial position after the unloading of the finished workpiece W is finished. After that, the workhand 7a of the loading arm unit 7 is lowered to grip a next-conveyed unfinished workpiece W. By the completion of these operations, one cycle operation designed for performing the loading and unloading the workpiece is completed. After that, the same cycle is continuously repeated.

Moreover, the direction changes of the loading arm unit 7 and the unloading arm unit 8 are carried out simultaneously since the loading arm unit 7 and the unloading arm unit 8 are installed integrally with the same bracket 6. That is, the loading arm unit 7 and the unloading arm unit 8 rotate together with each other by keeping the angle $\theta'$ formed between the axis of the guide bar 7b of the loading arm unit 7 and the axis of the guide bar 8b of the unloading arm unit 8.

However, in the arrangement of the above apparatus, the loading arm unit 7 and the unloading arm unit 8 are provided so as to be disposed in the same plane which is normal to the axis O of the work spindle, and are spaced with each other so that the axis of the loading arm unit 7 and the axis of the unloading arm unit 8 intersect at the angle $\theta'$, therefore, as shown in FIG. 1, the top part of the loading arm unit 7, which is a free end of the loading arm unit 7 rotatable about the axis of the rotational shaft 3, protrudes toward an outside of the machine tool. The condition shown by the solid line in FIG. 1 corresponds to the initial or usual standstill position of the machine tool. On the side that the upper part of the loading arm unit 7 inclines, there is usually provided a space for a worker who watches, administers or maintains the machine tool. Therefore, the protrusion of the upper part of the loading arm unit 7 becomes an obstacle for the worker, thus, the worker could not approach the machine tool in order to watch or administer or maintain the machine tool.

Furthermore, in the case that a diameter of the workhand 7a or 8a required for gripping the workpiece W becomes large, it has to be designed so that the angle $\theta'$ between the loading arm unit 7 and the unloading arm unit 8 becomes large as the diameter of the workhand 7a or 8a becomes large. It results in worsening the above problem. Namely, it becomes more difficult for the worker to approach the machine tool.

SUMMARY OF THE INVENTION

It is therefore an object of the present invention to overcome the problem encountered by the foregoing conventional apparatus and to provide an apparatus for loading and unloading a workpiece which is capable of reducing an amount of protrusion of a free end of loading arm unit and/or an unloading unit from machine tool to an outside of the machine tool, thereby improving working efficiency when a worker approaches to the machine tool in order to watch or administer or maintain the machine tool.

In short, the apparatus for loading and unloading the workpiece in accordance with the present invention, comprises a rotational shaft which rotates in each of a clockwise direction and a counterclockwise direction within a required rotational angle by an actuator, and a bracket which is fixedly connected with one end of the rotational shaft. The bracket supports a loading arm unit and an unloading unit. The loading arm unit and the unloading arm unit are installed on the bracket so as to be spaced with each other in a direction of an axis of a work spindle. These pair of the loading arm unit and the unloading arm unit have a gripping mechanism for gripping a workpiece, respectively. These gripping mechanism are controlled to shift along a pair of directions intersecting with each other at a predetermined angle at a position on or adjacent to a working position, respectively.

In accordance with the above arrangement, since the loading arm unit and the unloading unit are arrayed in the direction of the work spindle, it can be prevented that the loading arm unit and/or the unloading arm unit protrudes toward workers, thus, it results in reducing a space required for a machine tool and improving accessibility of the workers when they need to approach the machine tool.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiment which considered in connection with the accompanying drawings, in which.

DETAIL DESCRIPTION OF THE PREFERRED EMBODIMENT

Figure 1:
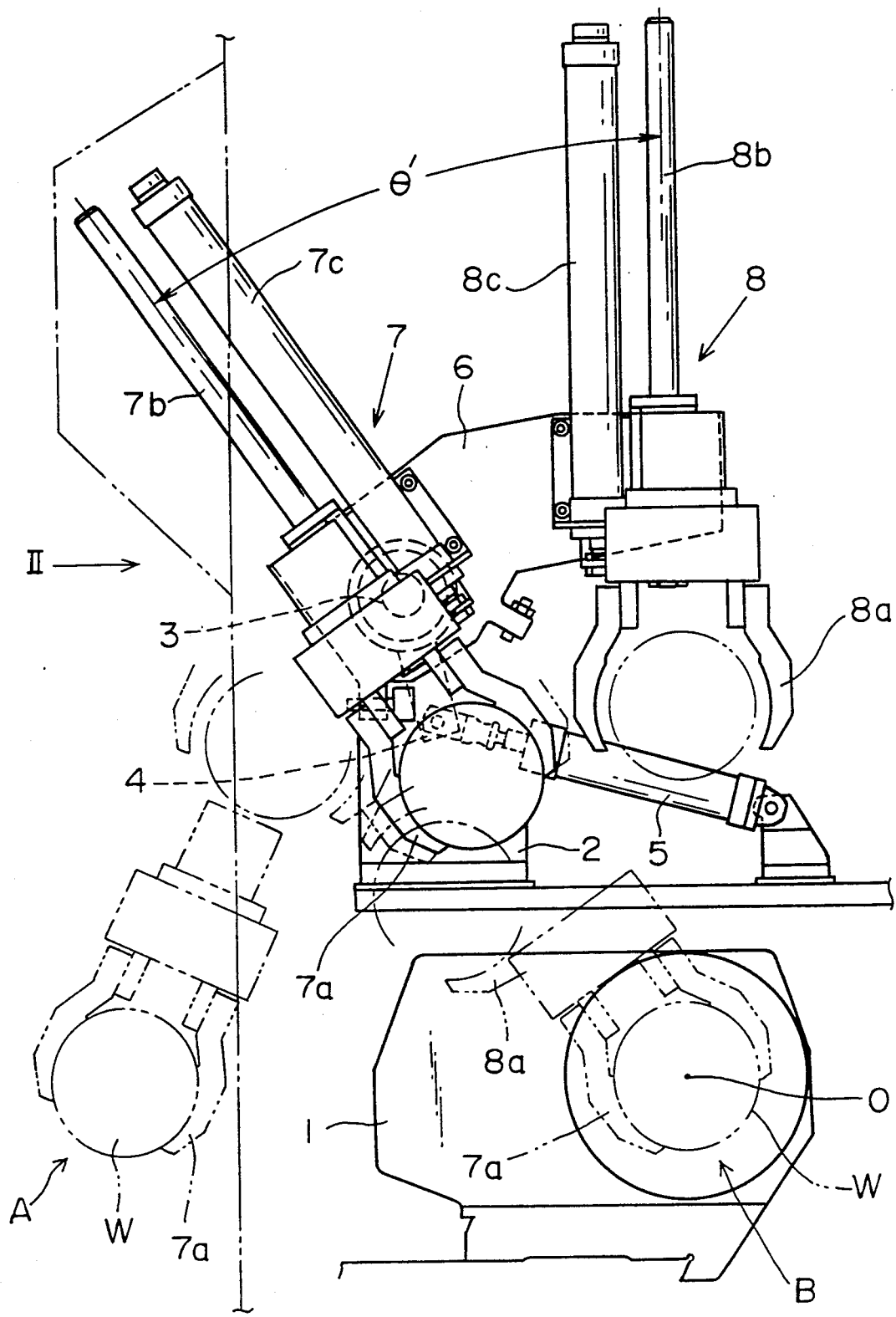
FIG. 1 is a side view showing a conventional apparatus for loading and unloading a workpiece.
Figure 2:
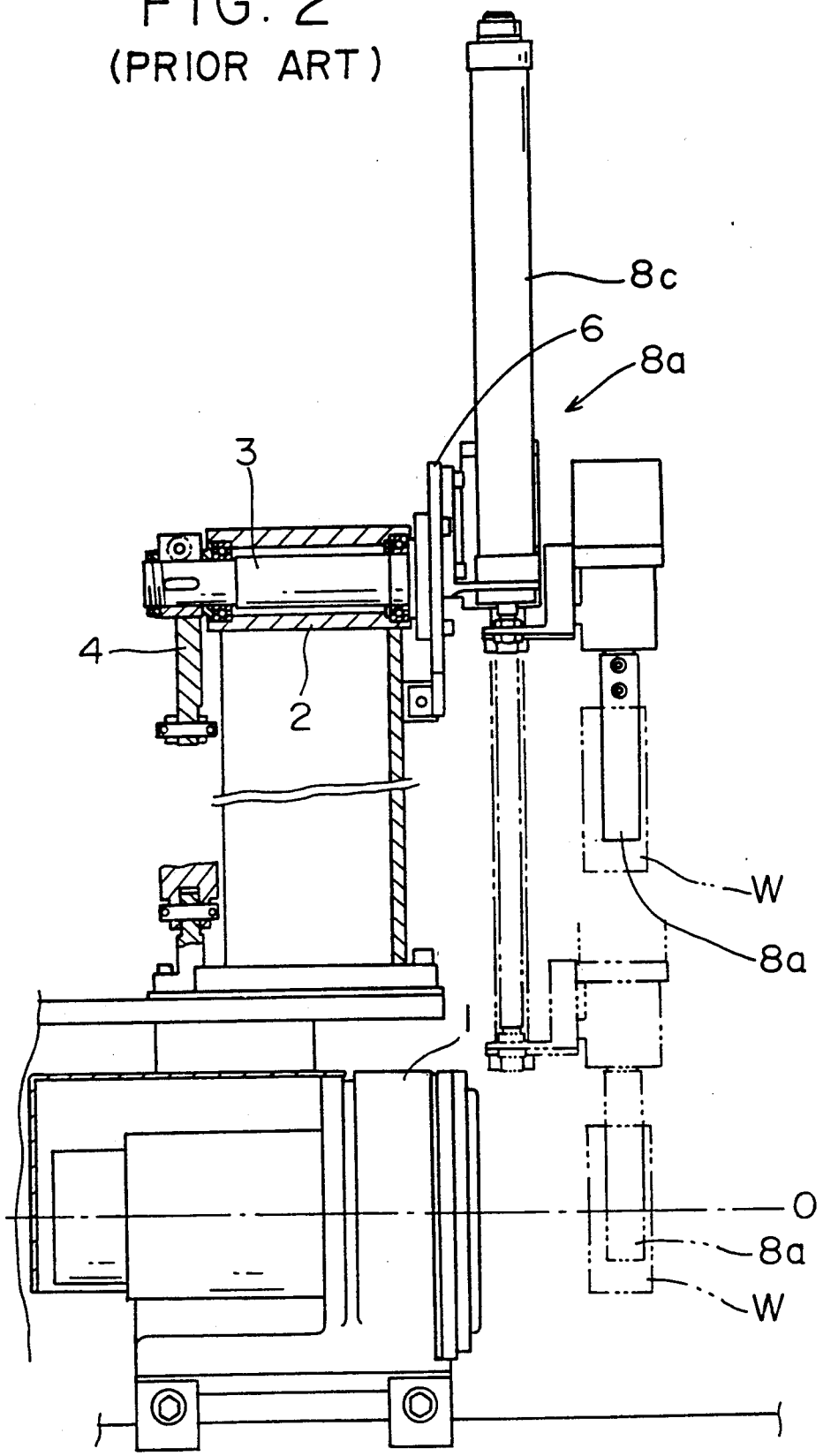
FIG. 2 is an elevation view seen from a direction of an arrow II of FIG. 1.
Figure 3:
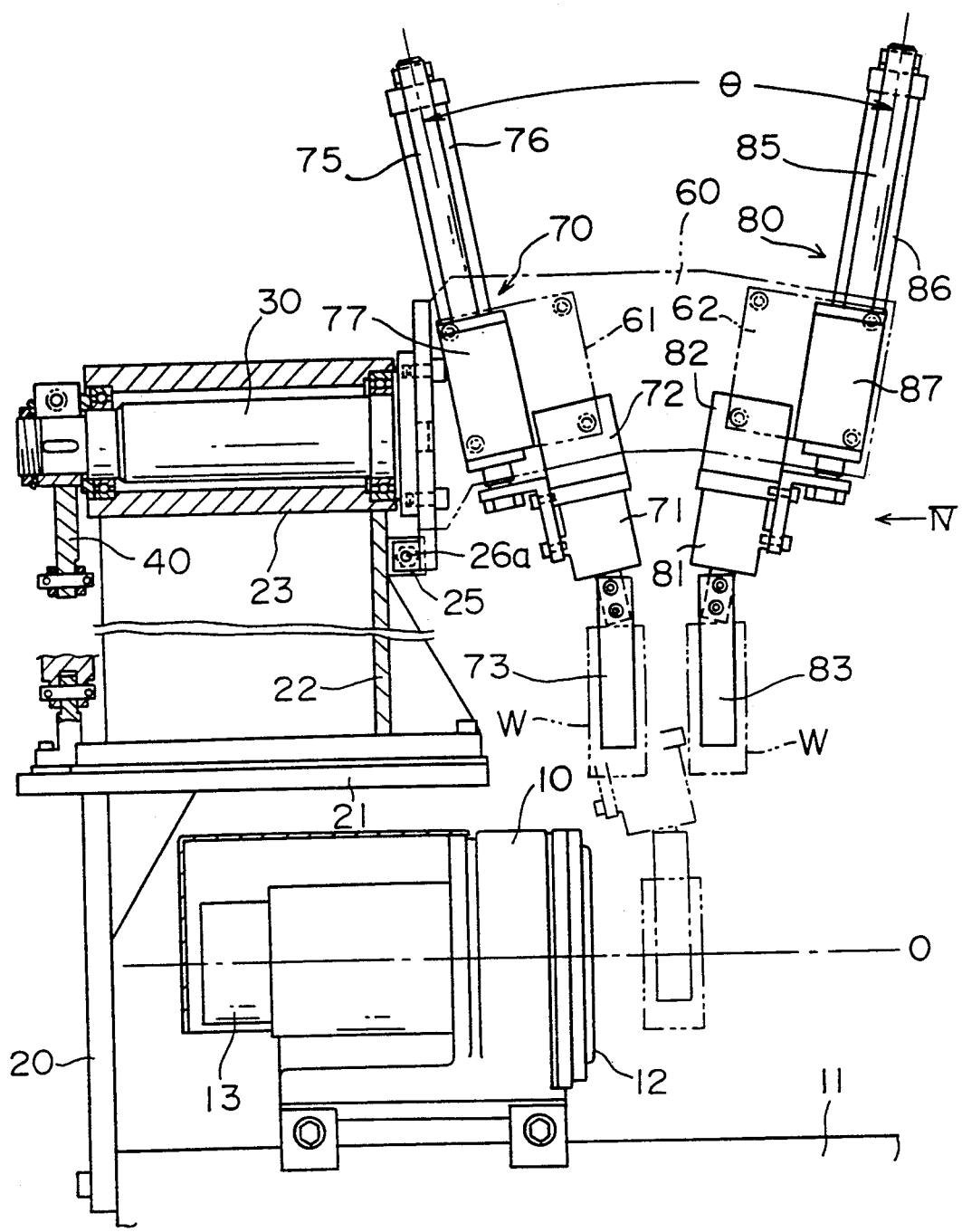
FIG. 3 is a front view showing an apparatus for loading and unloading a workpiece in accordance with the present invention.
Figure 4:
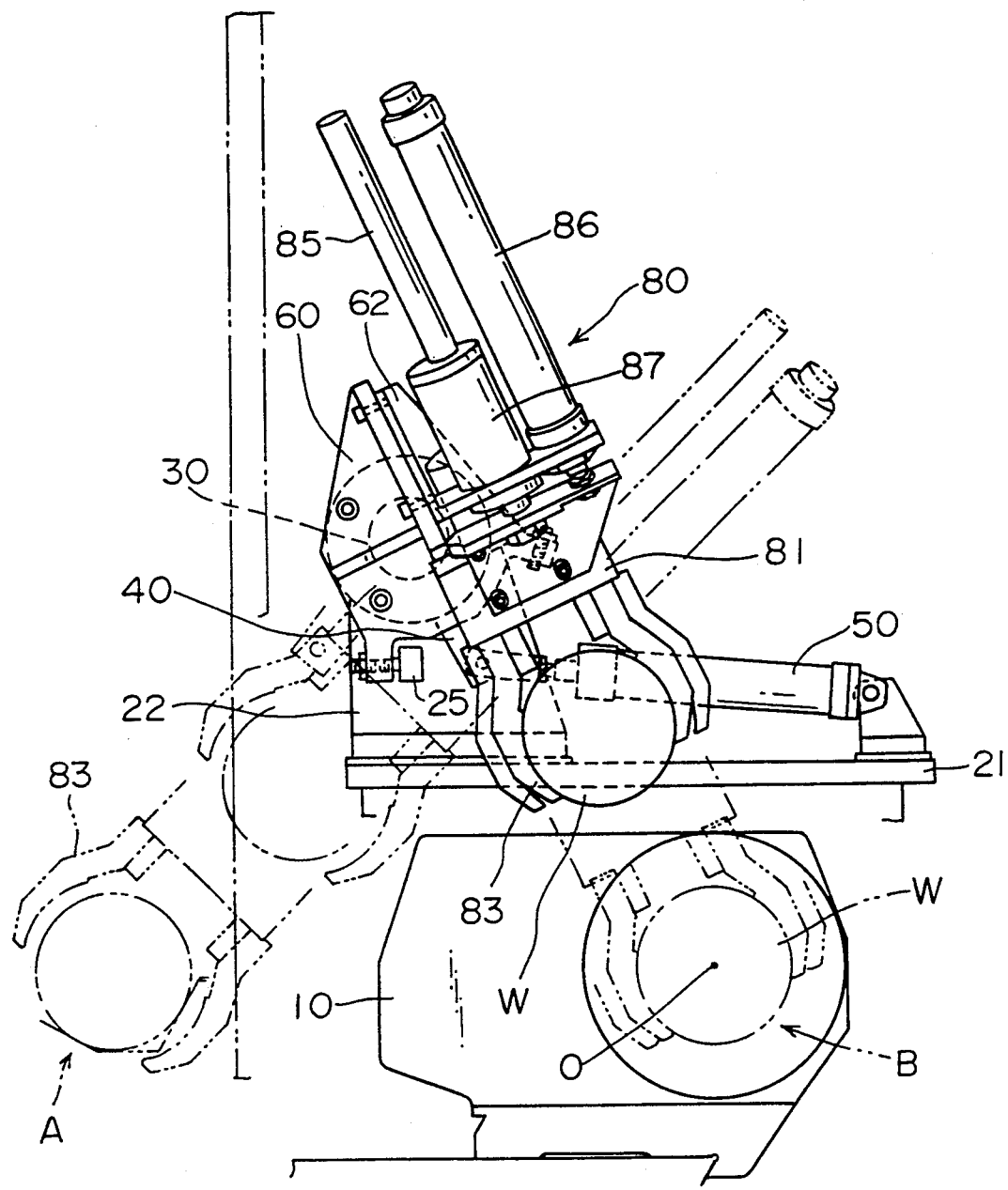
FIG. 4 is an elevation view seen from a direction of an arrow IV of FIG. 3.

Hereinafter, the preferred embodiment of the present invention is explained in more detail by referring to the drawings. In FIGS. 3 and 4, reference numeral 10 denotes a work head, which is installed on a bed 11. On the work head 10, there is provided a work spindle 12 which is supported to be rotatable about its rotational axis. The work spindle 12 is rotated by a driving motor 13. On a front surface of the workpiece spindle 12, there is installed a workpiece W by means of a working chuck, and a grinding work of the workpiece W is carried out by a grinding wheel.

Reference numeral 21 denotes a supporting board, which is fixedly provided on the bed 11 through an installation bracket 20. On the supporting board 21, there is installed a supporting cylinder 23 through a supporting bracket 22. In the supporting cylinder 23, a rotational shaft 30 is supported to be rotatable about its axis in such a manner that an axis of the rotational shaft 30 is disposed to be parallel with an axis O of the work spindle. One end of the rotational shaft 30 is fixedly connected with a lever 40. The lever 40 is connected with a piston rod 51 of a cylinder 50 for rotating the rotational shaft 30. A base portion of the cylinder 50 is hingedly supported on the supporting board 21. By the actuation of the cylinder 50, the rotational shaft 30 is rotated in a clockwise direction and a counterclockwise direction within a required rotational angle.

Moreover, the other end of the rotational shaft 30 is connected with a bracket 60 which has an installation surface extending in parallel with the axis O of the work spindle. On the base portion of the bracket 60, there are provided a pair of abutting members 26a, which restrict rotational movement of the end portion of the rotational shaft 30. These abutting members 26a, 26b are cooperative with a stopper 25 which is fixed on a supporting bracket 22 to restrict the rotational movement of the rotational shaft 30. Reference numeral 70 denotes a loading arm unit. The loading arm unit 70 includes a workhand 71 having a pair of gripping claws 73, 73. The gripping claws 73, 73 are controlled to be open or closed by an actuator 72. The workhand 71 is connected, through a bracket, with a lower end of a movable bar 75, which is guided to be slidable in an up-and-down direction by a guide cylinder 77. The loading arm unit 70 has further a cylinder 76 for shifting the workhand 71 in the up-and-down direction.

Reference numeral 80 denotes an unloading arm unit. The unloading arm unit 80 includes a workhand 81 having a pair of gripping claws 83, 83. The gripping claws 83, 83 are controlled to be open or closed by an actuator 82. The workhand 81 is connected, through a bracket, with a lower end of a movable bar 85, which is guided to be slidable in an up-and down direction by a guide cylinder 87. The unloading arm unit 80 has further a cylinder 86 for shifting the workhand 81 in the up-and-down direction. The cylinders 76 and 86 are the cylinders which utilize hydraulic pressures.

The loading arm unit 70 and the unloading arm unit 80 are fixed on the bracket 60 through an installation bracket 61 and an installation bracket 62, respectively.

The loading arm unit 70 and the unloading arm unit 80 are located to be disposed on a plane which includes the axis O of work spindle. The axis of the loading arm unit 70 is shifted in the up-and-down direction along a first line, and, on the contrary, the axis of the unloading unit 80 is shifted in the up-and-down direction along a second line. The first line and the second line intersect with each other at an angle θ at a point adjacent to a working position. The workhand 71 and 81 are shifted along these directions of the first line and the second line, respectively. Furthermore, the pair of gripping claws 73, 73 extend in a direction normal to the axis O of the work spindle, and the pair of gripping claws 83, 83 extend in the same direction which is normal to the axis O of the work spindle. These gripping claws 73, 73 and these gripping claws 83, 83 are located in parallel with each other at their original positions so as to maintain a predetermined gap between the gripping claws 73, 73 and the gripping claws 83, 83.

Next, the operation of the above-described apparatus is explained hereinafter.

First of all, while workpiece W loaded on a working position B is in a working operation, the loading arm unit 70 and the unloading arm unit 80 are positioned as are shown by solid lines in FIG. 3. The loading arm unit 70 holds an unfinished work W. When the working operation at the working position B is finished, the workhand 81 of the unloading arm unit 80 is lowered to grip a finished workpiece W. The workhand 81 is raised after it has gripped the finished workpiece W. When, the workhand 71 of the loading arm unit 70 is lowered to load the unfinished workpiece W on the working position B where the finished workpiece W manufactured in the previous working operation has been removed. The workhand 71 opens its gripping claws 73, 73 to release the unfinished workpiece W. The workhand 71 is raised after the releasing of the unfinished workpiece W is ended.

Moreover, the rotational shaft 30 is rotated in the clockwise direction in FIG. 4 so that both the workhand 71 and 81 are oriented to an waiting position A disposed outside the machine tool. After that, the workhand 81 of the unloading arm unit 80 is lowered. Thus, the finished workpiece W held in the gripping claws 83, 83 is moved to the waiting position A. The finished workpiece W is soon conveyed to an another place. Next, an unfinished new workpiece W is delivered to the waiting position A. Upon the arrival of the unfinished new workpiece W, the workhand 71 of the loading arm unit 70 is lowered to grip the unfinished new workpiece W. After the workhand 71 gripped the unfinished new workpiece W, the workhand 71 is raised to the initial position, and then, the rotational shaft 30 is rotated toward the counterclockwise direction, and the loading arm unit 70 returns to its original position, which is indicated by the solid line in FIG. 3. Thus, one cycle of the loading and unloading operation is completed. After that, the same loading and the unloading operation is repeated.

As can be understood from the foregoing explanation, the loading arm unit 70 and the unloading arm unit 80 are arrayed on the same plane which is disposed to be parallel with the axis of the work spindle, therefore, an amount of the protrusion of the loading arm unit 70 and the unloading arm unit 80 toward the outside of the machine tool, which causes interference with a worker who stands at a left side of the machine tool in FIG. 4, is remarkably reduced. Moreover, even if the workpiece W has a large diameter which requires correspondingly larger gripping claws 73, 73 and 83, 83 of the unloading arm unit 70 and an unloading arm unit 80, it is not necessary to expand the angle θ, though it was necessary in the conventional apparatus for loading and unloading a workpiece as described in the foregoing description.

Moreover, the present invention is not limited in the foregoing embodiment, therefore, the various modifications and changed are possible if required.

Obviously, numerous modifications and variations of the present invention are possible in light of the above teachings. It is therefore to be understood that within the scope of the appended claims, the present invention may be practiced otherwise than as specifically described herein. The present embodiment is therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

What is claimed is:

1. An apparatus for transferring workpieces between a machine tool having a work spindle rotatable about an axis, and a waiting position orthogonally spaced from the work spindle axis, comprising:

a supporting base;

a bracket mounted to the supporting base for rotation about an axis parallel to the work spindle axis;

an actuator for rotating said bracket;

a loading arm unit and an unloading arm unit mounted to said bracket for rotation therewith, said loading and unloading arm units being mutually spaced and lying in a plane substantially parallel to the rotational axis of said bracket;

first and second gripping mechanisms respectively mounted to said loading and unloading arm units for linear movement in said plane, said first gripping mechanism being mounted for movement along a first line and said second gripping mechanism being mounted for movement along a second line, said first and second lines being mutually angled so as to intersect substantially at said spindle axis when said bracket is at one rotational position, and so as to intersect substantially at the waiting position when said bracket is at another rotational position; and means for selectively moving said first and second gripping mechanisms along said lines so as to transfer workpieces between the work spindle and the waiting position.

2. An apparatus in accordance with claim 1 in which each of the gripping mechanisms of the pair of arm units has a pair of gripping claws extending in a direction normal to the axis of the work spindle.

3. An apparatus in accordance with claim 1 in which said means for selectively moving comprises guide mechanisms for guiding the gripping mechanisms so as to be shiftable along the first line and the second line, respectively, and cylinders driven by utilizing hydraulic pressure which shift the gripping mechanisms along guiding directions of the respective guide mechanisms.

* * * * *